United States Patent [19]
Malmvig

[11] 3,879,604
[45] Apr. 22, 1975

[54] APPARATUS FOR RECORDING THE PROGRESS OF A TITRATION

[75] Inventor: Henrik Malmvig, Hellerup, Denmark

[73] Assignee: Radiometer A/S, Copenhagen, Denmark

[22] Filed: July 11, 1973

[21] Appl. No.: 378,261

[30] Foreign Application Priority Data
July 11, 1972 United Kingdom............. 32366/72

[52] U.S. Cl.......... 235/151.3; 235/151.12; 23/253 R
[51] Int. Cl........................ G01n 31/16; G06g 7/18
[58] Field of Search....... 235/151.3, 151.12, 151.35, 235/184, 183; 23/253 R

[56] References Cited
UNITED STATES PATENTS

| | | | |
|---|---|---|---|
| 3,186,800 | 6/1965 | Strickler | 23/253 R |
| 3,192,017 | 6/1965 | Kruger | 23/253 R |
| 3,246,952 | 4/1966 | Dawe | 23/253 R |
| 3,266,504 | 8/1966 | Sundstrom | 235/151.12 X |
| 3,275,533 | 9/1966 | Boronkay | 23/253 R X |
| 3,489,520 | 1/1970 | Chartouni et al. | 23/253 R |
| 3,489,524 | 1/1970 | Anthon | 23/253 R |
| 3,649,205 | 3/1972 | Shirakawa et al. | 23/253 R |
| 3,713,774 | 1/1973 | Southwick | 23/253 R |
| 3,730,685 | 5/1973 | Prohaska | 235/151.12 X |
| 3,738,812 | 6/1973 | Berry et al. | 23/253 R |

*Primary Examiner*—Malcolm A. Morrison
*Assistant Examiner*—Edward J. Wise
*Attorney, Agent, or Firm*—Robert E. Burns; Emmanuel J. Lobato; Bruce L. Adams

[57] ABSTRACT

An apparatus for registering the progress of a titration. A measuring device, which may include electrochemical electrodes for currently measuring a parameter of the solution being titrated and for providing a corresponding electrical signal. The variations of the electrical signal are currently being compensated by a compensating signal provided by an electronic compensating circuit, and corresponding values of the amount of titrant added to the solution to be titrated and of the parameter measured are currently registered or recorded by a recording device, such as a servo recorder. The addition of titrant and the progress of the titration may be controlled by a controller device in response to the measuring and compensating signal.

20 Claims, 2 Drawing Figures

IMPROVED APPARATUS FOR RECORDING THE PROGRESS OF A TITRATION

BACKGROUND OF THE INVENTION

1. Field of the Invention

The present invention relates an improved apparatus for registering or recording the progress of a titration, in particular by registering during the titration procedure corresponding values of the amount of titrant added to the liquid to be titrated, and a parameter, e.g. pH or conductivity, varying in response to the addition of titrant.

2. Description of the Prior Art

Titration of a liquid is a quantitative method in chemical analysis based on a known chemical reaction between two or more known substances — normally in solution. The titration is performed so that one of the substances (the titrant) taking part in the chemical reaction is added in a controlled manner. Thereby the amount of the aubstnace to be determined is diminished, and when the said substance has just been totally consumed or transformed the so-called "equivalence point" of the titration has been reached. The unknown amount of the substance to be determined may now be calculated on the basis of the total amount of titrant which has been added for reaching the equivalence point.

In order to determine the equivalence point of a titration it is quite often necessary during the titration procedure currently to register corresponding values of the amount of titrant added and the parameter measured in the solution and varying in response to the addition of titrant. The said parameter may for example be measured by means of electrochemical electrodes arranged in the liquid or solution being titrated and providing an electrical voltage signal changing in response to the amount of added titrant. The desired registration of corresponding values might for example be obtained by feeding the signal from the electrochemical electrodes to a conventional potentiometric survey recorder of the type having a pen for recording a graph on a paper chart. Thus, the said signal may control the movement of the pen in relation to the paper chart. Titrant may continuously be fed to the solution to be titrated from an automatic burette, and the paper chart drive of the survey recorder may be connected to the piston of the burette so that the paper chart is displaced in response to the amount of titrant discharged from the burette. However, in order to obtain a reliable graph the addition of titrant must be rather slow so as to minimize the influence of the inevitable delays resulting from the mixing time in the solution, the electrode response time, and the reaction time in the solution. These delays are especially pronounced near the equivalence point. It has been proposed to reduce these problems by reducing the discharge rate of the burette, for example by a factor of ten, well before the equivalence point is reached. Then, however, it is necessary to know the approximate position of the equivalence point or points on the graph. It is also known to control the discharge rate of the burette by a signal derivated from the signal provided by the measuring electrochemical electrodes. However, the electrode signal often varies very rapidly around the equivalence point and then — due to the above delays — the rate of feeding titrant from the burette to the solution will often not be sufficiently decreased before the titration point has been reached.

The above problems have been solved by the provision of the apparatus disclosed in applicants' U.S. Pat. No. 2,994,590. By means of this known apparatus it is possible to obtain a very satisfactory titration curve at an optimum average titration rate. In the said known apparatus the amount of titrant or titrating agent fed into the solution to be titrated is controlled by means comprising a tracking potentiometer or voltage divider having a moving part which is mechanically connected to the driving means for the paper chart of the servo recorder. Thus, the said known apparatus requires use of special survey recorder which cannot be used for recording other types of laboratory processes. Furthermore, it is rather critical that the tracking potentiometer used in the known apparatus has a high stability and especially a high linearity, and these demands make the potentiometer an expensive component of the known apparatus. Moreover, the operation of the known apparatus is impeded by the fact that the tracking potentiometer has to be reset by hand or by some complicated mechanical means, before a new titration may be initiated.

SUMMARY OF THE INVENTION

The invention relates to an apparatus for registering the progress of a titration, said apparatus comprising in combination (a) means for adding a titrant to a solution to be titrated and thereby changing a parameter of the said solution, (b) means for measuring said parameter and for providing a varying measuring signal having a predetermined relationship to said parameter, (c) an electronic circuit for providing an electrical compensation signal, (d) a control circuit for currently controlling the steps (a), (b), and (c) so that the titration proceeds and so as to substantially compensate the variation of said measuring signal during the titration and (e) means for currently registering corresponding values of the amount of titrant added and the parameter measured, the compensating signal or values derived therefrom.

The titrant may be added to the solution in any suitable manner such as by a volumetric method, for example by means of an automatic burette, or by a coulometric method. The parameter varying in response to the amount of titrant added to the solution being titrated may also be measured in any suitable manner, such as by a potentiometric, a conductometric, a photometric, or an amperometric method.

In principle the said compensating signal may be any signal being able to compensate the measuring signal variations occurring during the titration, and the compensation of the measuring signal may be obtained by varying the rate of compensation or the addition of titrant or of both in dependency of the immediate noncompensated variation of the measuring signal. However, it is possible to vary only one of said rates, such as the rate of adding titrant, while the other is maintained substantially constant. When the compensation of the variations in the measuring signal is performed by varying the rate of feeding titrant into the solution to be titrated, this variation may be obtained either by feeding the titrant continuously at a varying rate or by feeding the titrant in a discontinuous manner. In the last mentioned case the desired variation of feeding rate may be obtained by varying the relation between the periods in which no titrant is fed and the periods in which titrant is fed at a substantially constant rate. The compensation of the measuring signal may, alternatively, be obtained by varying the rates of as well the compensation as of the titrant fed. In the last mentioned case the compensation desired may be obtained by varying the rate of compensation and/or the rate of feeding titrant by using an on-off technique. If both of said rates are varied it may be advantageous to feed titrant to the solution when no compensating signal is provided and to provide a compensation signal in the periods when no titrant is fed.

The desired registration of corresponding values of the amount of titrant added and the parameter measured may be obtained by any suitable registering or recording device. For example the said values may be provided in the form of digital data which may be registered in the form of punched paper tape, punched cards, recorded magnetic tape, or the like, or the said registering device may comprise a computer memory forming part of a computer in which the recorded data may be further processed. The said corresponding values may alternatively be transmitted to the registering and recording device in an analog form, and in that case the recording device may be adapted to record the data as a graph or curve, the values representing the amount of added titrant being plotted along a first of two co-ordinate axes, and the values representing the parameter being plotted along the other axis. The last mentioned values may for example be derived from the compensating signal.

In case the said correspondng values are plotted as a graph or curve the relative movement of the recording medium in relation to the pen or recording member along a first of the co-ordinate axes may for example be controlled by a signal originating from the means for adding titrant. That signal may be an analog signal or a sequence of electrical pulses controlling a stepping driving motor. Alternatively, the said relative movement may be provided by mechanical movement transmission means connecting the recording device and a movable part of the means for feeding titrant. The relative movement along the other co-ordinate axis may, for example, be controlled by an analog signal or a sequence of electrical pulses derived from the measuring signal or the compensating signal.

BRIEF DESCRIPTION OF THE DRAWING

The invention will now be further described in relation to preferred embodiments and with reference to the drawing, wherein.

DESCRIPTION OF PREFERRED EMBODIMENTS

Figure 1:
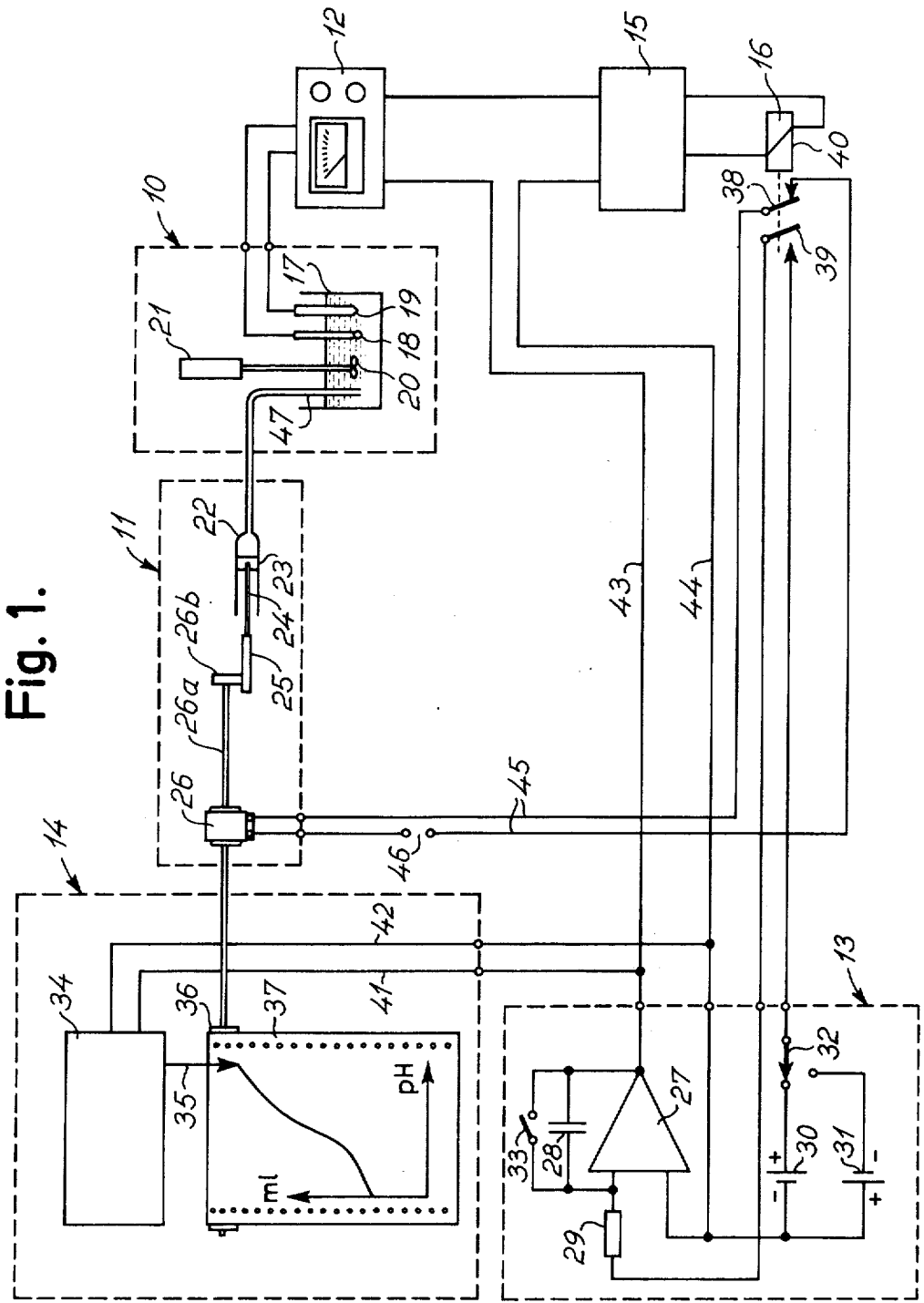
FIG. 1 is a diagrammatic representation of an embodiment of the apparatus according to the invention.

The apparatus shown in FIG. 1 comprises a titration assembly 10, an automatic burette assembly 11 for supplying a titrant thereto, a measuring device 12 for measuring a parameter of a test solution in the titration assembly 10, a compensating circuit 13, a recording device 14 for recording corresponding values of the measured parameter of the test solution and of the amount of titrant added by the burette assembly 11, and a controller device 15 for controlling the operational sequence of the apparatus by means of a relay 16. The controller device may for example be of the type obtainable from Radiometer A/S, Copenhagen under the tradename "Titrator TTT 60".

The titration assembly comprises a titration vessel 17 for containing the test liquid or test solution to be titrated, and a measuring electrode 18 and a reference electrode 19 the type of which depends on the parameter measured. In the following description, however, it is assumed that the parameter to be measured is the pH-value of the test liquid. The titration vessel 17 further contains an agitating member or a propeller 20 having a driving motor 21.

The automatic burette assembly 11 comprises a burette 22 having a movable piston 23 which is mounted on a piston rod 24 having a spindle 25 at one end. The burette 22 is operated by a driving motor 26 having a driving shaft 26a on the end of which a gear 26b is mounted so as to cooperate with the spindle 25.

The measuring device or pH-meter 12 preferably includes an amplifier for amplifying the signals obtained from the electrodes 18 and 19, and the pH-meter may also be provided with means for addition or subtraction of an adjustable voltage and a gain control whereby buffer adjustment and temperature correction may be performed. As indicated in FIG. 1 the measuring device 12 may have a pointer or another displaying device for displaying the measured pH-value. The output signal of the pH-meter is a voltage proportional to the input electrode voltage and to the displayed pH-value.

The compensation circuit 13 comprises an amplifier 27, a capacitor 28, a resistor 29, two galvanic cells 30 and 31, and a switch 32. The amplifier 27 and the capacitor 28 form an analog integrator which may integrate a voltage signal received from the cells 30 and 31. The compensating circuit also comprises a switch 33 by means of which the capacitor may be short-circuited.

The recording device 14 may, for example, be a potentiometric servorecorder comprising a servomotor device 34 adapted to move a recording member or a pen 35 substantially proportional to an input voltage signal received from the output of the compensating circuit 13. The recording device 14 further comprises a driving roller 36 for a recording medium or a chart 37, and, as indicated in FIG. 1, the said driving roller is connected to and driven by the motor 26.

The relay 16 comprises two contacts or switches 38 and 39 and a relay coil 40 which may move the switches and contacts simultaneously between two positions in which one of the contacts is opened whereas the other is closed.

The function of the apparatus shown in FIG. 1 is substantially as follows:

The solution to be titrated is placed in the titration vessel 17, and a suitable titrant or titrating agent is filled into the burette 22. In the following description it is assumed that the solution in the vessel 17 is an acid solution, and that the titrant is a base. It is also assumed that the output voltage signal provided by the measuring device or pH-meter 12 is a positive voltage increasing with increasing pH of the solution in the vessel 17. Thus, the variations of the measuring signal provided by the measuring device 12 will go in the positive direction, and consequently the compensating signal to be provided by the compensating circuit 13 must be a negative voltage signal. Therefore, before initiating the titration procedure it must be ascertained that the switch 32 is in its upper position as shown in FIG. 1 so that only the galvanic cell 30 having a polarity as indicated in FIG. 1 is used. In case the titration to be performed is of such a type that the measuring signal provided by the device 12 is decreasing the switch 32 must be switched to the other position whereby the cell 31 having a polarity opposite to that of the cell 30, is used. Before the titration starts the capacitor 28 is short-circuited by the switch 33, the pen 35 of the recording device and the piston 23 of the burette 22 are in their left positions as viewed in FIG. 1. The controller device is now manually set at a set point voltage being a little lower than the output voltage or the pH-meter 12 at the beginning of the titration. The relay 16 is controlled by the controlling device 15 in such a manner that the relay coil is energized when the input voltage of the controller device is lower than the set point value thereof, and when the relay coil 40 is energized the contact or switch 38 is held in its closed position whereas the contact or switch 39 is opened as indicated in FIG. 1. When the coil 40 is de-energized the switches 38 and 39 are moved to their opposite positions in which the switch 38 is opened and the switch 39 is closed.

When the titration is started the set point value is a little lower than the input voltage as previously mentioned, and therefore the coil 40 will be de-energized so that the contact 39 is closed and the contact 38 opened. Consequently the analog integrator formed by the amplifier 27, the capacitor 28, and the resistor 29 starts integrating the voltage received from the galvanic cell 30. Thus, the compensating circuit 13 provides an output signal or a negative compensating voltage signal, the nominal value of which is increasing with respect to time. The said voltage signal is transmitted to the servomotor device 34 through conductors 41 and 42, and the increasing voltage signal will cause the pen 35 to move to the right along a first co-ordinate axis (as viewed in FIG. 1) and for a distance substantially proportional to the value of the increasing negative compensating signal. However, the compensating signal is also supplied to the input of the controller device 15 so that the resulting input voltage supplied thereto is decreasing. When the said input voltage becomes lower than the set point value of the controller device, the relay coil 40 is energized whereby the switches or contacts 38 and 39 are moved to their positions shown in FIG. 1. This means that the integrating process in the compensating circuit 13 is interrupted whereby movement of the pen 35 is stopped. It should be understood that the pen displacement obtained will be substantially proportional to the measuring signal obtained from the measuring device 12. The closing of the contact 38 establish a power supply circuit 45 for the driving motor 26, and electrical power will be supplied to the motor 26 from a current source 46. This means that the shaft 26a and the gear 26b start rotating, whereby the piston 23 of the burette 22 is moved to the right (as viewed in FIG.1) whereby titrant is fed to the vessel 17 through a titrant feeding conduit 47. The rotating movement of the shaft of the driving motor 26 is transmitted to the driving roller 36, whereby the chart 37 is displaced in relation to the pen 35 along a second co-ordinate axis. The said relative displacement is proportional to the amount of titrant fed to the vessel 17 and constitutes a value for that amount.

When the solution to be titrated is an acid solution and the titrant is a base, the feeding of titrant to the vessel 17 results in an increasing pH. In response to the increase of pH the electrodes 18 and 19 and consequently the pH-meter 12 will provide an increasing positive output voltage or measuring voltage signal. This means that the input voltage supplied to the controller device 15 and being a sum of the positive measuring voltage signal and the negative compensation voltage signal (the value of the latter being constant at the moment) is increasing. When the increasing input voltage of the controller device 15 has passed the set point value of the controller device the relay coil 40 will be de-energized, whereby the switch 38 will be opened so as to stop the motor 26, and the feeding of titrant to the vessel 17. Simultaneously the contact 39 will be closed whereby the analog integration in the compensating circuit will be continued so that the compensating signal or the negative output voltage of the compensating circuit will again increase in value proportional with respect to time and from the maximum value obtained during the previous cycles. The pen 35 will now move further to the right corresponding to the increasing value of the negative compensating signal. When the input voltage of the controller device 15 has reached the predetermined level the relay coil 40 is again energized, and a new integrating cycle will start etc.

In this manner a curve or graph showing the progress of the titration may be stepwise plotted on the chart 37 in an automatic manner.

Figure 2:
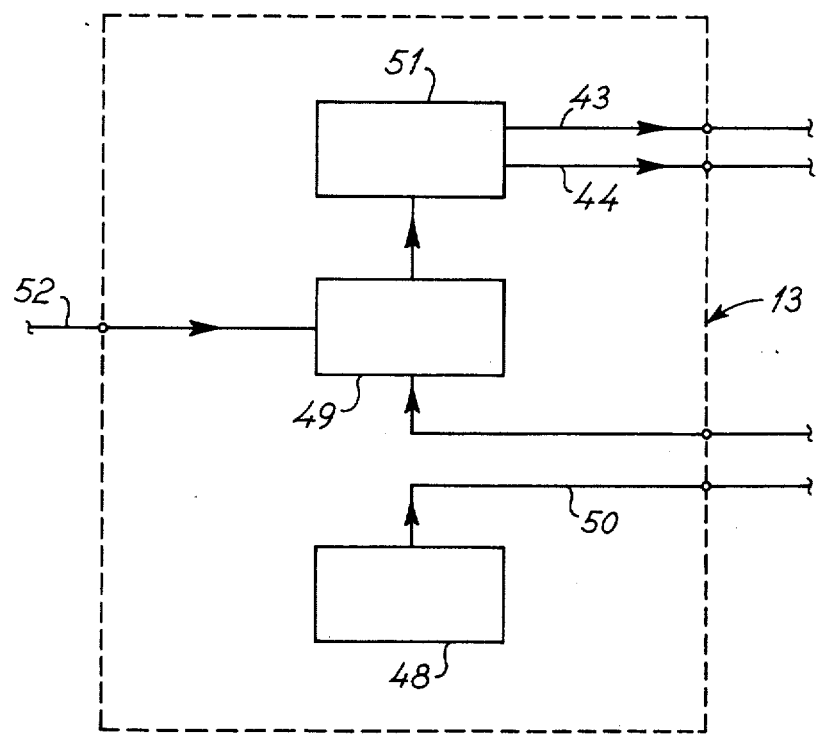
FIG. 2 is a diagrammatic representation of another embodiment of the compensating circuit.

FIG. 2 shows a modified embodiment of the compensating circuit 13. The modified embodiment comprises a pulse generator 48 connected to a counter 49 through a conductor 50 containing the switch or contact 39 controlled by the relay 40. The counter 49 counts the pulses received from the pulse generator when the contact 39 is closed and stores the countings when the said contact is opened. The output of the counter is connected to a digital/analog converter 51 which provides an output voltage proportional to the number of pulses counted by the counter 49. The output voltage or compensating signal provided by the converter 51 is transmitted to the servomotor device 34 and to the controller device 15 through the conductors 43 and 44. Before a new titration is started the counter 49 may be cleared by a clearing signal transmitted to a conductor 52.

Although the invention has been described in relation to presently preferred embodiments it will be understood that various changes and modifications may be made without departing from the scope and the spirit of the invention.

I claim:

1. An apparatus for registering the progress of a titration, said apparatus comprising in combination
    a. means for measuring a parameter of a test liquid and providing an electrical voltage signal having a predetermined relationship to said parameter,
    b. supply means for supplying a titrating agent into the test liquid so as to obtain variation of said parameter,
    c. a recording device of the type having a recording medium, a recording member for making records thereon, and first and second driving means for mutually displacing said record medium and said record member along respective co-ordinate axes, said first driving means including means for controlling said supply means so as to supply an amount of titrating agent as a predetermined function of said mutual displacement provided by said first driving means along a first of said co-ordinate axes, d. an electrical circuit for providing a compensating voltage signal changing substantially proportional with respect to the total period of time in which the said circuit has been energized during the titration procedure, said second driving means including a servomotor electrically connected to and controlled by said electrical circuit in such a manner that said mutual displacement along a second of said co-ordinate axes takes place as a predetermined function of the total time in which said electrical circuit has been energized, and e. a controller device for receiving said measuring and compensating signals and adapted to energize and de-energize at least one of said driving means so as to maintain the sum of said measuring and compensating voltage signals substantially constant.

2. An apparatus according to claim 1, wherein said first driving means are adapted to control said supply means in such a manner that titrating agent is supplied substantially proportional to said mutual displacement along said first co-ordinate axis.

3. An apparatus according to claim 2, wherein said electrical circuit comprises an electrical direct current source having an analog integrating device for integrating an electrical signal supplied from said source.

4. An apparatus according to claim 3, wherein said analog integrating device comprises a capacitor.

5. An apparatus according to claim 4, wherein said analog integrating device further comprises a resetting switch by means of which said capacitor may be short-circuited.

6. An apparatus according to claim 1, wherein the said controller device is adapted to energize and de-energize said first driving means.

7. An apparatus according to claim 1, wherein said controller device comprises a relay for energizing and de-energizing the said first driving means, and for de-energizing said electrical circuit when the first driving means are being energized and vice versa.

8. An apparatus according to claim 1, wherein said electrical circuit comprises an electrical pulse source and a digital/analog converter for counting said pulses and converting them into a voltage proportional to the number of pulses counted.

9. An apparatus for registering the progress of a titration, said apparatus comprising in combination a. electrochemical electrodes for measuring a parameter of a test liquid and providing a measuring voltage signal, b. supply means for supplying a titrating agent into the test liquid, c. a recording apparatus of the type having a recording medium, a writing member for making visual records therein, and first and second driving means for mutually relative displacing said record medium and said writing member along respective co-ordinate axes, said first driving means being operatively connected to said supply means for supplying into the test liquid an amount of titrating agent substantially proportional to said mutual relative displacement of the record medium and the writing member provided by said first driving means along a first of said co-ordinate axes, d. an electrical circuit comprising an electrical current source and an analog integrating device for integrating an electrical signal supplied from said source so as to provide a compensating voltage signal changing substantially proportional with respect to the total time in which electrical signals have been received from said current source by the analog integrating device, said second driving means including a servomotor electrically connected to and controlled by the output of said integrating device whereby said mutual displacement along a second of said co-ordinate axes is performed proportional to the output voltage of the control circuit, and e. a controller device comprising a relay device adapted to simultaneously energizing said first driving means and de-energizing said integrating device and vice versa, said relay device being controlled by the sum of said measuring and compensating signals in such a manner that the relay device is switched over when said sum deviates substantially from a preset value.

10. An apparatus according to claim 9, wherein said analog integrating device comprises a capacitor.

11. A recording titration device according to claim 10, wherein said analog integrating device further comprises a resetting switch by means of which said capacitor may be short-circuited.

12. An apparatus for registering the progress of a titration, said apparatus comprising in combination a. means for measuring a parameter of a test liquid and providing an electrical voltage signal having a predetermined relationship to said parameter, b. supply means for supplying a titrating agent into the test liquid so as to obtain variation of said parameter, c. a recording device of the type having a recording medium, a recording member for making records thereon, and first and second driving means for mutually displacing said record medium and said record member along respective co-ordinate axes, said first driving means including means for controlling said supply means so as to supply an amount of titrating agent as a predetermined function of said mutual displacement provided by said first driving means along a first of said co-ordinate axes, d. an electrical circuit for providing a compensating voltage signal changing with respect to the total period of time in which the said circuit has been energized during the titration procedure, said second driving means being controlled by said electrical circuit in such a manner that said mutual displacement along a second of said co-ordinate axes takes place as a predetermined function of said electrical signal, and e. a controller device for receiving said measuring and compensating signals and adapted to energize and de-energize at least one of said driving means so as to maintain the sum of said measuring and compensating voltage signals substantially constant.

13. An apparatus according to claim 12, wherein said second driving means are being controlled by said electrical circuit in such a manner that said mutual displacement along a second of said co-ordinate axes takes place as a direct function of said compensating voltage signal.

14. An apparatus according to claim 13, wherein said controller device is shiftable between a first condition in which it energizes said first driving means and de-energizes said electrical circuit, and a second condition in which said controller device de-energizes said first driving means and energizes said electrical circuit, said controller device being controlled by the sum of said measuring and compensating voltage signals in such a manner that said controller device is shifted from one of said conditions to the other when said sum deviates substantially from a preset value.

15. An apparatus according to claim 13, wherein said first driving means are adapted to control said supply means in such a manner that titrating agent is supplied substantially proportional to said mutual displacement along said first co-ordinate axis.

16. An apparatus according to claim 15, wherein said electrical circuit comprises an electrical direct current source having an analog integrating device for integrating an electrical signal supplied from said source.

17. An apparatus according to claim 16, wherein said analog integrating device comprises a capacitor.

18. An apparatus according to claim 17, wherein said analog integrating device further comprises a resetting switch by means of which said capacitor may be short-circuited.

19. An apparatus according to claim 13, wherein said controller device comprises a relay for energizing and de-energizing the said first driving means, and for de-energizing said electrical circuit when the first driving means are being energized and vice versa.

20. An apparatus according to claim 13, wherein said electrical circuit comprises an electrical pulse source and a digital/analog converter for counting said pulses and converting them into a voltage proportional to the number of pulses counted.

* * * * *